United States Patent
Newman et al.

(10) Patent No.: US 7,251,453 B1
(45) Date of Patent: *Jul. 31, 2007

(54) MOBILE MARINE COMMUNICATIONS APPARATUS AND METHOD FOR USE OF SAME

(75) Inventors: Kent David Newman, Hurst, TX (US); Todd William Crocker, Flower Mound, TX (US)

(73) Assignee: Uniden America Corporation, Ft. Worth, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/110,566

(22) Filed: Apr. 20, 2005

Related U.S. Application Data

(63) Continuation-in-part of application No. 10/206,502, filed on Jul. 26, 2002, now Pat. No. 6,980,770.

(51) Int. Cl.
*H04B 7/15* (2006.01)

(52) U.S. Cl. .................... 455/11.1; 455/573; 455/569.1

(58) Field of Classification Search ............... 455/11.1, 455/66.1, 67.1
See application file for complete search history.

(56) References Cited

U.S. PATENT DOCUMENTS 5,163,158 A * 11/1992 Tendler et al. ............. 455/11.1
5,231,699 A * 7/1993 Tendler ..................... 455/66.1

* cited by examiner

*Primary Examiner*—Joseph Feild
*Assistant Examiner*—Phuoc Doan
(74) *Attorney, Agent, or Firm*—Lawrence R. Youst; Kenneth T. Emanuelson; Danamraj & Youst, P.C.

(57) ABSTRACT

A marine radio wireless communication system (10) incorporating a remote wireless handset (26) and a fixed mount marine radio (18) for wireless communication on board a waterborne vessel (12) is disclosed. At least one marine radio remote wireless handset (26) is associated with and wirelessly linked to the fixed mount marine radio (18) for onboard remote acoustic communications between the two. Each fixed mount marine radio (18) and marine radio remote wireless handset (26) incorporates a speaker (80, 106) and a microphone (72, 102).

20 Claims, 5 Drawing Sheets

MOBILE MARINE COMMUNICATIONS APPARATUS AND METHOD FOR USE OF SAME

CROSS-REFERENCE TO RELATED APPLICATIONS

This application is a continuation-in-part application of U.S. patent application Ser. No. 10/206,502 entitled "Mobile Marine Communications Apparatus" filed Jul. 26, 2002 now U.S. Pat. No. 6,980,770.

TECHNICAL FIELD OF THE INVENTION

This invention relates, in general, to the transmission of marine radio frequency communications between a fixed mount marine radio station and remote marine radio stations and, in particular, to a fixed mount marine radio and a system and method for communications on board a waterborne vessel.

BACKGROUND OF THE INVENTION

A shipboard radio station includes all of the transmitting and receiving equipment installed aboard a ship for communications afloat. Depending on the size, purpose or destination of a ship, its radio station must meet certain requirements established by law or treaty. For example, large passenger or cargo ships that travel on the open sea are required by the Communications Act and by international agreements to be equipped with a radio station for long distance radio communications. Passenger ships that travel along the coast must be able to communicate at shorter range with coast stations. These are examples of "compulsory ships" because they are required or compelled by treaty or statute to be equipped with specified communications equipment.

Smaller ships used for recreation, e.g., sailing, diving, fishing or water skiing, are not required to have radio stations installed but they may be so equipped by choice. These ships are known as "voluntary ships" because they are not required by treaty or statute to carry a radio but may voluntarily fit some of the same equipment used by compulsory ships.

A shipboard radio station may communicate with other ship stations or coast stations primarily for safety, and secondarily for navigation and operational efficiency. The FCC regulates marine communications in cooperation with the U.S. Coast Guard, which monitors marine distress frequencies continuously to protect life and property. Ship station equipment often includes a fixed mount marine radio frequency transceiver, a radar system, Emergency Position Indicating Radio Beacons (EPIBs), single sideband radiotelephones and satellite radios.

In particular, marine radio frequency transceivers, generally referred to as "marine radios" or sometimes "marine transceivers", are an important part of a marine communication system. A marine radio can be employed to call a remote ship station, place a call through a public coast station, receive a shore to ship call or initiate a marine distress call. For example, an operator places a call to a remote ship station by first ensuring that the fixed mount marine radio is operational. The operator then selects Channel 16 (156.8 MHz) and listens to make sure it is not being used. Alternatively, Channel 9 (156.45 MHz) may be used by recreational vessels for general purpose calling. This frequency should be used whenever possible to relieve congestion of Channel 16. When the channel is quiet, the operator places the call to the ship. The operator speaks directly into the fixed mount marine radio microphone in a normal tone of voice with clarity and distinctiveness and states "[name of ship being called] THIS IS [the name and call sign (if applicable) of the ship where the call is being placed]." Once contact is made on Channel 16, the ships switch to a ship-to-ship channel. For example, if the call regards a noncommercial message, Channel 71, 72 or 78 may be selected. Alternatively, if the call regards a navigational message, Channel 13 or 67 may be selected. After communications are completed, each ship provides its call sign or ship name and switches back to Channel 16.

Typical marine radios are fixed mounted at the radio station of the vessel. Usually, the radio station of the vessel is positioned at the bridge. Although a fixed mount marine radio can be very useful for communications between the bridge and vessels and locations outside of the vessel, a fixed mount marine radio generally has little utility for communication between points onboard the vessel.

SUMMARY OF THE INVENTION

The present invention disclosed herein comprises a mobile communications apparatus for wireless communication onboard a waterborne vessel having a fixed mount frequency transceiver. The system and methods of the present invention enable crew members to send and receive communications between one another at any time and between any two locations in the vessel.

According to a first embodiment, the present invention is a method of communicating between a first wireless marine radio component and a second wireless radio component of a marine radio frequency communication system disposed on-board a waterborne vessel. The method comprises the steps of establishing a first wireless communication link between the first wireless marine radio component and the second wireless marine radio component, receiving an acoustic input signal at the first wireless marine radio component, processing the acoustic input signal within the first wireless marine radio component to generate a first electrical signal representing the acoustic input signal, transmitting a wireless signal incorporating the first electrical signal from the first wireless marine radio component to the second wireless marine radio component across the first wireless communication link, receiving the wireless signal at the second wireless marine radio component, processing the wireless signal within the second wireless marine radio component to generate a second electrical signal representing the acoustic input signal and generating an acoustic output signal at the second wireless marine radio component representing the acoustic input signal.

According to a second embodiment, the present invention is an apparatus for communicating within a marine radio frequency communication system disposed on-board a waterborne vessel. The apparatus comprises a first wireless marine radio component, a second wireless marine radio component and a pair of transceiver-antenna assemblies for establishing a wireless communication link between the first wireless marine radio component and the second wireless marine radio component. The apparatus further includes a microphone for receiving an acoustic input signal at the first wireless marine radio component and processing the acoustic input signal within the first wireless marine radio component to generate a first electrical signal representing the acoustic input signal. A first antenna is incorporated for transmitting a wireless signal incorporating the first electrical signal from the first wireless marine radio component to the second wireless marine radio component across the wireless communication link along with a second antenna for receiving the wireless signal at the second wireless marine radio component. Finally, the apparatus includes a transceiver for processing the wireless signal within the second wireless marine radio component to generate a second electrical signal representing the acoustic input signal and a speaker for generating an acoustic output signal at the second wireless marine radio component representing the acoustic input signal.

According to a third embodiment, the present invention is a wireless marine radio system comprising first and second wireless marine radio components. The first wireless marine radio component incorporates a first microphone, a first speaker, a first local wireless transceiver operably connected to a first local wireless antenna and a first processor operable to coordinate communication between the first microphone, the first speaker and the first local wireless transceiver. The second wireless marine radio component incorporates a second microphone, a second speaker, a second local wireless transceiver operably connected to a second local wireless antenna and a second processor operable to coordinate communication between the second microphone, the second speaker and the second local wireless transceiver. The first local wireless transceiver and second local wireless transceiver are operable to establish a local wireless link through the first and second local wireless antennas, and each of the first and second processors communicate signals from the respective first and second microphones across the wireless link and communicate signals received across the wireless link to the respective first and second speakers.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
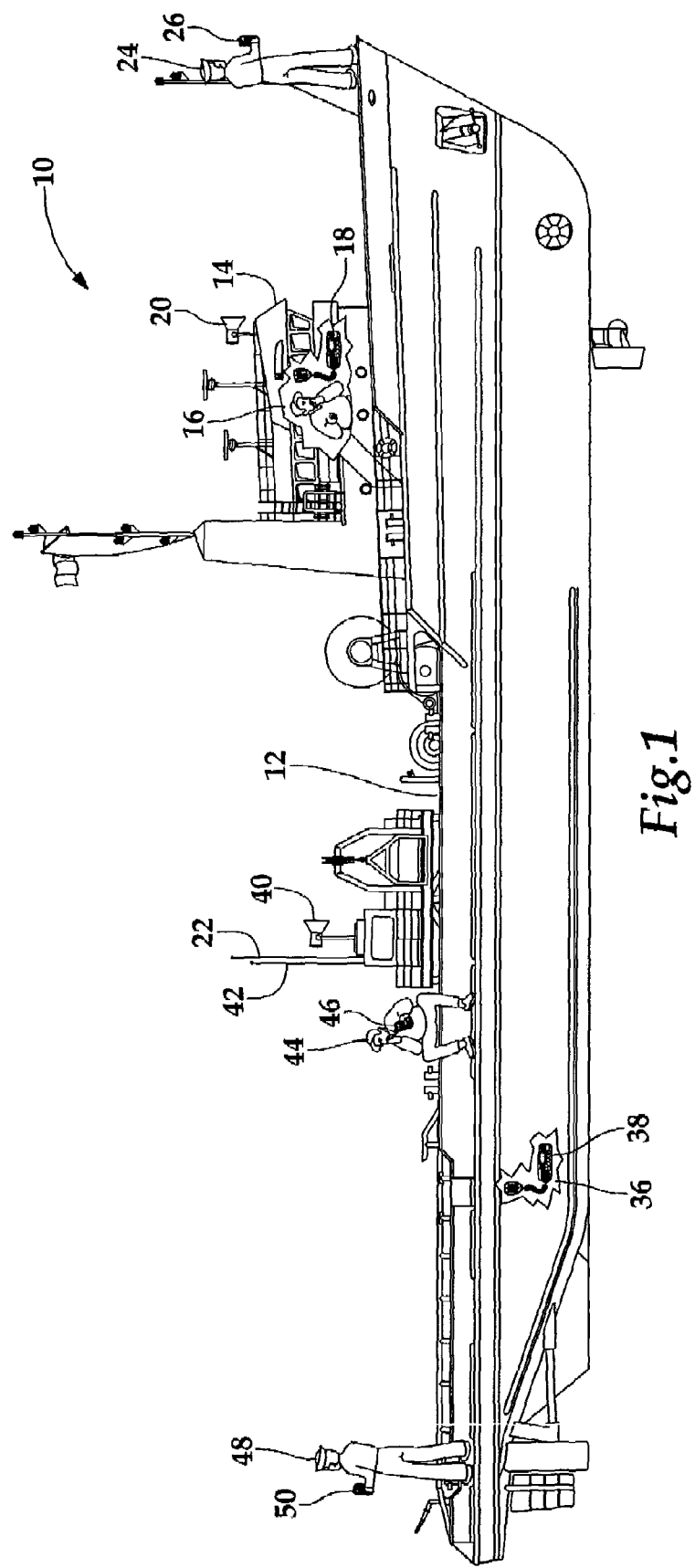
FIG. 1 is a schematic illustration with partial cut away of a wireless marine communications system of the present invention employed on a marine vessel.

Referring initially to FIG. 1, a wireless marine communications system 10 of the present invention is shown employed in a marine vessel 12. A first shipboard radio station 16 positioned at the bridge 14 of marine vessel 12 is fitted with a first fixed mount marine radio frequency transceiver, or "marine radio" 18. A loud speaker 20 and antenna 22 are coupled to fixed mount marine radio 18 to provide audio and wireless marine communications, respectively. Preferably, fixed mount marine radio 18 is a very high frequency (VHF) frequency modulation (FM) transceiver that allows shipboard radio station 16 to communicate with other remote shipboard radio stations (not shown) and coast stations (not shown) over relatively short distances by generating and receiving frequency modulated electromagnetic (EM) signals at certain predetermined radio frequency channels, specifically marine radio frequency channels. In certain embodiments, fixed mount marine radio 18 is able to send and receive on all USA and International marine radio frequency channels.

On the deck of vessel 12, seaman 24 is holding a marine radio remote wireless handset 26 which wirelessly communicates with fixed mount marine radio 18. In certain embodiments, the marine radio remote wireless handset 26 may enable an operator to send and receive marine communications from any position on waterborne marine vessel 12. For example, as illustrated, seaman 24 is positioned towards the bow of the marine vessel 12 and away from the bridge 14 and fixed mount marine radio 18. Marine radio remote wireless handset 26, however, provides communication capability between seaman 24 and bridge 14 via wireless communication with fixed mount marine radio 18. As such, marine radio remote wireless handset 26 provides intercom communication with the bridge 14. In addition, marine radio remote wireless handset 26 may also provide the capability to make and receive marine radio frequency calls via fixed mount marine radio 18. It should be apparent to those skilled in the art that while fixed mount marine radio 18 sends and receives inter-vessel marine communications on a wide band of marine frequencies, such as VHF band, over relatively great distances, marine radio remote wireless handset 26 may receive intra-vessel marine communications at a different frequency band.

A second shipboard radio station 36 positioned at the stern of marine vessel 12 is fitted with a second fixed mount marine radio frequency transceiver 38. As above, a loud speaker 40 and antenna 42 are coupled to fixed mount marine radio 38 to facilitate audio and marine radio frequency communications, respectively. Similar to fixed mount marine radio 18, fixed mount marine radio 38 is in certain embodiments able to send and receive on all USA and International marine channels. Accordingly, fixed mount marine radio 38 may serve as a fully-functional backup radio in the event that fixed mount marine radio 18 experiences a malfunction. Seamen 44, 48 are holding marine radio remote wireless handsets 46, 50 respectively which wirelessly communicate with fixed mount marine radio 38. In certain embodiments, the marine radio remote wireless handsets 46, 50 may enable seamen 44, 48 to send and receive marine radio frequency communications through fixed mount marine radio 38 from any position on marine vessel 12.

Each marine radio remote wireless handset 26, 46, 50 is operable to transmit messages to and receive messages from the fixed mount marine radio 18 or 38 to which it is wirelessly linked. Further, in certain embodiments each marine radio remote wireless handset 26, 46, 50 is operable to communicate with each of the other marine radio remote wireless handsets 26, 46, 50 in the marine communications system 10. In such embodiments, seaman 24 is able to communicate with seaman 44 by means of the marine radio remote wireless handsets 26, 46 carried by the two.

Figure 2:
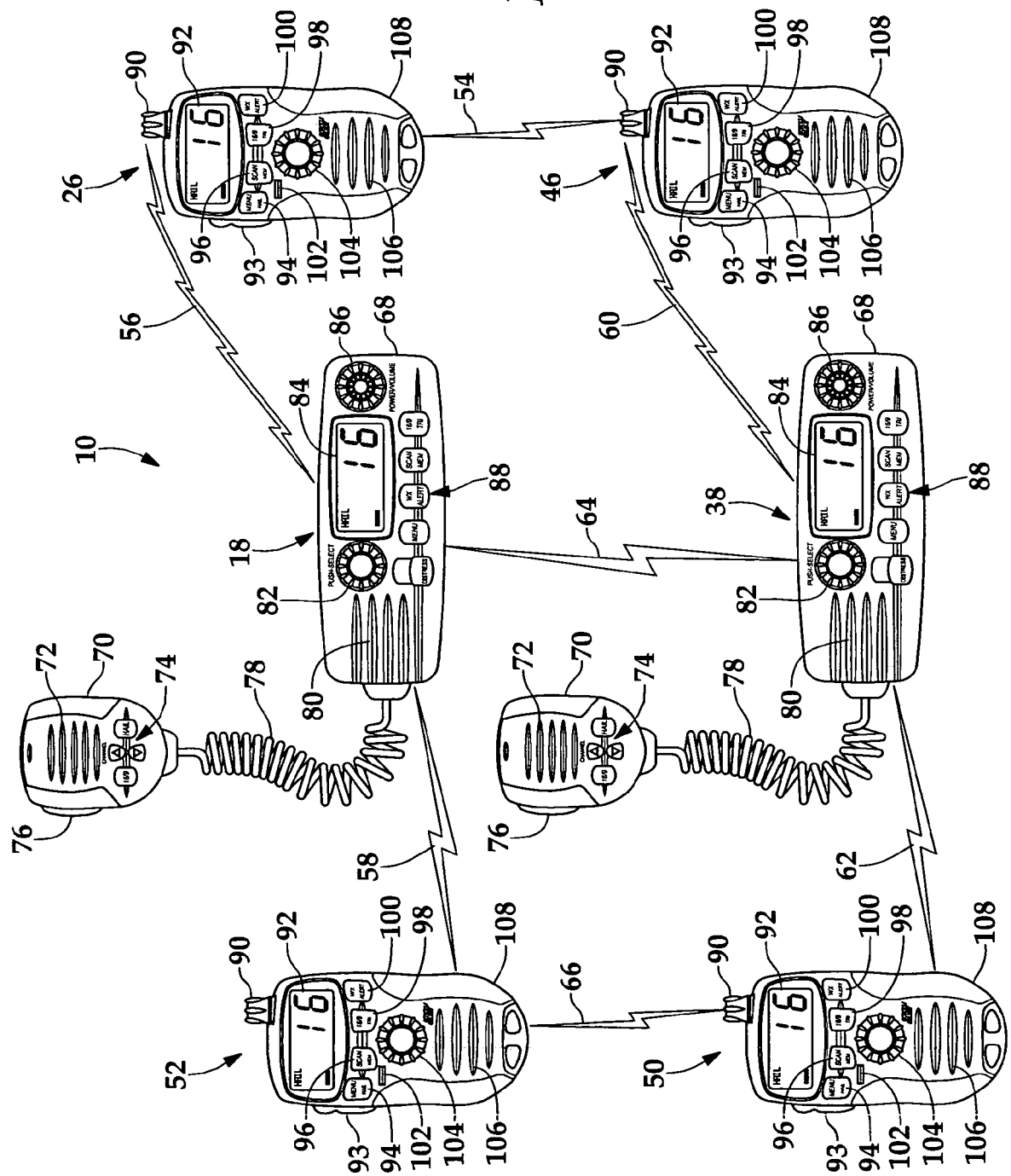
FIG. 2 is a schematic illustration of the wireless marine communications system of the present invention.

Referring now to FIG. 2, wireless marine radio communication system 10 is illustrated schematically. A first fixed mount marine radio 18 is in direct wireless communication with marine radio remote wireless handset 26, marine radio remote wireless handset 52 and fixed mount marine radio 38 as represented by communication lines 56, 58 and 64 respectively. A second fixed mount marine radio 38 is in direct wireless communication with marine radio remote wireless handset 46, marine radio remote wireless handset 50 and fixed mount marine radio 18, as represented by communication lines 60, 62 and 64 respectively. In certain embodiments, the wireless communication may occur at 900 MHz, 2.4 Ghz or 5.8 GHz. It should be understood, however, that fixed mount marine radios 18, 38 and marine radio remote wireless handsets 26, 46, 50, 52 may communicate at other frequencies depending on multiple considerations including technological limitations, manufacturing costs and government regulations.

Each fixed mount marine radio 18, 38 includes a fixed transceiver base 68 and a hand microphone 70. Fixed mount marine radios 18, 38 are selectively operable to transmit marine radio frequency communications in a sending mode and receive marine radio frequency communications in a receiving mode. Each hand microphone 70 connected to a fixed mount marine radio 18, 38 may include a microphone 72, function keys 74 and push to talk actuator 76. Each hand microphone 70 may receive acoustic inputs for marine radio frequency communication when a fixed mount marine radio 18, 38 is in the sending mode. Push to talk actuator 76 may selectively operate a fixed mount marine radio 18, 38 to which it is attached between the sending mode and the receiving mode. With this arrangement, when push to talk actuator 76 is depressed, acoustic input signals received by microphone 72 are transmitted by the attached fixed mount marine radio 18, 38 over the currently selected marine radio frequency channel. As illustrated, function keys 74 may include 16/9 channel function keys, channel selection keys and hailer keys. A 16/9 channel key tunes the fixed mount marine radio to Channel 16 (156.8 MHz) with one click and to Channel 9 (156.45 MHz) with two clicks. Channel 16 is the international distress, safety and calling channel. Boats and ships required to carry a fixed mount marine radio maintain a listening watch on this channel, as does the United States Coast Guard. Boaters use this channel to get the attention of another station in an emergency, and may also use this channel to initiate non-emergency contact with other vessels. Once contact is initiated on Channel 16, extended communication between vessels is carried out on one of the other channels. Channel 9 is the boater calling channel established by the Federal Communications Commission (FCC) as a supplementary calling channel for noncommercial vessels and recreational boaters to ease the congestion of Channel 16. Accordingly, the ease of access that the 16/9 channel function provides to Channels 16 and 9 is very valuable on navigable waterways.

Each channel selection key provides easy channel selection with an up arrow that switches to the next channel up and a down arrow that switches to the next channel down. Each hailer key changes the mode of marine communication from wireless to auditory by switching the output of the attached fixed mount marine radio 18, 38 from its antenna 22, 42 to the attached loud speaker 20, 40.

A wireline 78 connects each hand microphone 70 to the fixed transceiver base 68 of a fixed mount marine radio frequency transceiver 18, 38. Each fixed transceiver base 68 includes a speaker 80 that generates sound associated with marine communications when the fixed mount marine radio 18, 38 is in its receiving mode. Push-select knobs 82 facilitate navigation of software menus. Displays 84 display information about the function of fixed marine radios 18, 38 such as the currently tuned channels. Power/volume controls 86 control transceiver power and audio output volume level.

As illustrated, function keys 88 may include distress call keys, menu keys, weather (WX) alert keys, scan memory keys and 16/9 TRI keys. A distress call key sends out a distress call in Digital Selective Calling (DSC). In general DSC is used to establish communications with ship or coast stations or to receive calls from other ships or coast stations. DSC works in conjunction with VHF, MF and HF radio systems and employs a two tone digital signal protocol to selectively call a particular station or to call a group of stations, all stations in a particular geographic area, or to call all stations.

The menu keys provide access to the software menus. The software menus provide features such as a programmable memory. The WX alert keys change the channel to the last used weather channel. Alternatively, the weather alert function may be equipped with Specific Area Message Encoding (SAME). The scan memory keys scan preprogrammed channels. The 16/9/TRI keys access Channel 16 and Channel 9 and provide a triple watch mode. It should be understood by those skilled in the art that although the fixed mount marine radios 18, 38 are illustrated and described above as having certain functions, other functions known in marine radio frequency communications are within the teachings of and do not depart from the present invention. For example, a fixed mount marine radio 18, 38 is often equipped with a squelch control key in order to eliminate output noise when no marine communication or an extremely weak marine communication is received.

Each of the four marine radio remote wireless handsets 26, 46, 50, 52 may maintain one or more wireless links to one or more wireless components of the system 10. As an example, marine radio remote wireless handset 26 is shown maintaining wireless link 56 to fixed mount marine radio frequency transceiver 18 and wireless link 54 to marine radio remote wireless handset 46. Similarly, marine radio remote wireless handset 50 is shown maintaining wireless link 62 to fixed mount marine radio frequency transceiver 38 and wireless link 66 to marine radio remote wireless handset 52. At other times, marine radio remote wireless handset 50 may establish a wireless link (not shown) to marine radio remote wireless handset 26 or marine radio remote wireless handset 46, as examples. In certain embodiments, marine radio remote wireless handset 50 may be capable of establishing a direct wireless link (not shown) to fixed mount marine radio frequency transceiver 18.

In certain embodiments, wireless links between fixed mount marine radios 18, 38 and marine radio remote wireless handsets 26, 46, 50, 52 are established and maintained through the menu systems of fixed mount marine radios 18, 38, which can be controlled via the menu keys described above. Using the menu system, a fixed mount marine radio 18, 38 could be set to establish a wireless link to one or more of marine radio remote wireless handsets 26, 46, 50, 52 and/or another fixed mount marine radio 18, 38. In certain situations, the wireless link(s) may be full-duplex communication links providing for two-way communications between a fixed mount marine radio 18, 38 and other wireless components while in other situations the wireless link(s) may be half-duplex communication links providing for one-way communications. Fixed mount marine radio 18 might, for example, be set to transmit a one-way announcement to a set of other wireless components. Conversely, fixed mount marine radio 18 might be set to monitor, or listen to, a set of other wireless components. As another possibility, the entire wireless marine communication system 10 may be set up to provide full, open conference capability among all of the wireless components. Accordingly, a wide variety of potential wireless link configurations is possible.

In certain embodiments, less than full wireless connection flexibility may be provided for. In one embodiment, only one of the two marine radio frequency transceivers 18, 38 may have the capability to establish wireless links to marine radio wireless handsets 26, 46, 50, 52. In another embodiment, each of the fixed mount marine radio frequency transceivers 18, 38 may have the capability to establish wireless links to one or more marine radio remote wireless handsets, but the marine radio remote wireless handsets linked to one fixed mount marine radio frequency transceiver 18, 38 may not necessarily have the capability to communicate with the marine radio remote wireless handsets linked to the other fixed mount marine radio frequency transceiver 18, 38. FIG. 1 would reflect this embodiment if wireless links 54 and 66 were deleted.

Wireless links 54, 56, 58, 60, 62, 64, 66 are used by the wireless components of system 10 to transmit various forms of data. At certain times, the data transmitted over wireless links 54, 56, 58, 60, 62, 64, 66 may be system handshaking and other data periodically shared between the wireless components. At other times, the data transmitted over wireless links 54, 56, 58, 60, 62, 64, 66 may represent voice data communicated between seamen 24, 44, 48. In the latter mode, an acoustic transducer incorporated within one wireless component converts an acoustic signal to an electrical signal, with is further processed and converted into a wireless signal. The wireless signal is transmitted over one or more of wireless links 54, 56, 58, 60, 62, 64, 66 to one or more other wireless components. At the receiving end of the one or more wireless links 54, 56, 58, 60, 62, 64, 66 the wireless signal is processed and converted to an electrical signal, which is then converted by another acoustic transducer into an acoustic signal at the wireless component receiving the wireless signal. In most embodiments, one or more wireless components at the receiving end of the wireless links 54, 56, 58, 60, 62, 64, 66 will have the capability to transmit a signal as well, thereby facilitating two-way communication. Such a signal may be sent over the same wireless link 54, 56, 58, 60, 62, 64, 66 over which the original signal was received, or may be sent over a separate wireless link 54, 56, 58, 60, 62, 64, 66.

In the embodiment shown in FIG. 2, a push to talk actuator 93 is positioned on the side of each marine radio remote wireless handset 26, 46, 50, 52. Similar to push to talk actuators 76, push to talk actuators 93 selectively operate marine radio remote wireless handsets 26, 46, 50, 52 and in certain embodiments fixed mount marine radios 18, 38 between the sending mode and the receiving mode. In certain embodiments any marine radio remote wireless handset 26, 46, 50, 52 can send a signal to fixed mount marine radio 18, 38 to switch fixed mount marine radio 18, 38 to the send mode whenever the push to talk actuator 93 is depressed. It should be understood by those skilled in the art that although a particular system of control interrupts has been presented, alternative interrupt schemes are within the teachings of the present invention.

Each marine radio remote wireless handset 26, 46, 50, 52 includes a display 92 to provide a functionality similar to display 84 of fixed mount marine radios 18, 38. Functions incorporated into marine radio remote wireless handsets 26, 46, 50, 52 may include menu/hail keys 94, scan memory keys 96, 16/9 TRI keys 98 and WX alert keys 100. These function keys 96, 98, 100 may be essentially identical to the function keys 74 and 88 positioned on the transceiver base of each fixed mount marine radio 18, 38. As briefly described already and as will be described in more detail hereinbelow, when a function is selected on marine radio remote wireless handset 74, the function is sent to fixed mount marine radio 18, 38 where the function is performed and an output is sent back to marine radio remote wireless handset 26, 46, 50, 52. Similar to functions 74 and 88 of fixed mount marine radios 18, 38, other functions known in marine communications may be employed with the marine radio remote wireless handsets 26, 46, 50, 52 of the present invention. Further disclosure of the manner of operation of fixed mount marine radios and marine radio remote wireless handsets is shown and described in United States utility patent application Ser. No. 10/206,502 entitled "Mobile Marine Communications Apparatus" filed Jul. 26, 2002, which is hereby incorporated by reference for all purposes and specifically for these teachings.

Within each marine radio remote wireless handset 26, 46, 50, 52 a microphone 102 receives acoustic input for wireless communication to other components of system 10. A scroll/select knob 104 provides a navigation tool for the software menu. A speaker 106 generates acoustic outputs representing the content of received wireless communications. A waterproof casing 108 is disposed about each marine radio remote wireless handset 26, 46, 50, 52 to provide protection from water. Optionally, each marine radio remote wireless handset 26, 46, 50, 52 may include a belt clip or other suitable carrying mechanism. It should be appreciated by those skilled in the art that although only four marine radio remote wireless handsets 26, 46, 50, 52 are presented communicating with fixed mount marine radios 18, 38, more or fewer than four marine radio remote wireless handsets 26, 46, 50, 52 may be employed to communicate with fixed mount marine radios 18, 38.

In a similar manner to that described above with respect to the menu systems for fixed mount marine radios 18, 38, wireless links between fixed mount marine radios 18, 38 and marine radio remote wireless handsets 26, 46, 50, 52 can also be established and maintained through the menu systems of marine radio remote wireless handsets 26, 46, 50, 52, which can be controlled via the menu keys described above. Using the menu system, a marine radio remote wireless handset 26, 46, 50, 52 could be set to establish a wireless link to one or more of marine radio remote wireless handsets 26, 46, 50, 52 and/or a fixed mount marine radio 18, 38. In certain situations, the wireless link(s) may be full-duplex communication links providing for two-way communications between a marine radio remote wireless handset 26, 46, 50, 52 and other wireless components while in other situations the wireless link(s) may be half-duplex communication links providing for one-way communications. A marine radio remote wireless handset 26, 46, 50, 52 might, for example, be set to transmit a one-way announcement to a set of other wireless components. Conversely, a marine radio remote wireless handset 26, 46, 50, 52 might be set to monitor, or listen to, a set of other wireless components. As another possibility, the entire wireless marine communication system 10 may be set up to provide full, open conference capability among all of the wireless components. Accordingly, a wide variety of potential wireless link configurations is possible.

In the embodiment shown in FIG. 2 each marine radio remote wireless handset 26, 46, 50, 52 includes a channel selection mechanism 90. By turning channel selection mechanism 90 to the left or right, a marine radio channel may be selected. The marine radio remote wireless handset 26, 46, 50, 52 relays the channel selection to the connected fixed mount marine radio 18, 38 on a frequency, such as 900 MHz, 2.4 Ghz or 5.8 Ghz. The fixed mount marine radio 18, 38 then tunes in to the selected channel and relays marine communications to the marine radio remote wireless handset 26, 46, 50, 52. Fixed mount marine radio 18, 38 may tune into Coast Guard Channel 22A (157.1 MHz), the "piloting" Channel 13 (156.65 MHz) or ship-to-ship safety Channel 6 (156.3 MHZ), for example.

Figure 3:
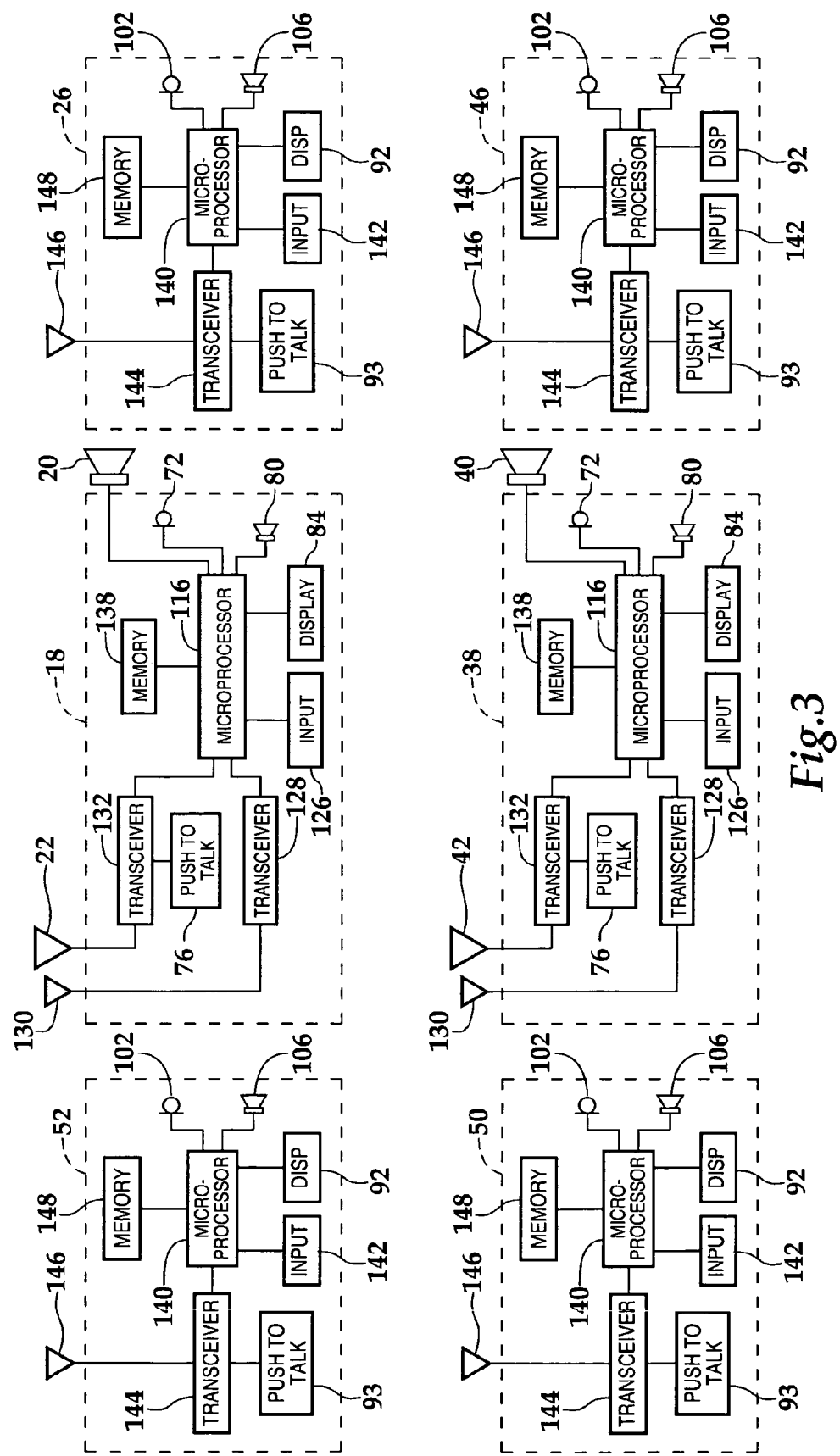
FIG. 3 is a functional block diagram of the wireless marine communications system of the present invention.

Referring now to FIG. 3, the marine communications system 10 of the present invention is depicted in a functional block diagram. Fixed mount marine radios 18, 38 and marine radio remote wireless handsets 26, 46, 50, 50 are operable to form mutual wireless links as depicted in FIG. 2. Fixed mount marine radios 18, 38 and marine radio remote wireless handsets 26, 46, 50, 52 may communicate at 900 MHz, 2.4 Ghz, 5.8 Ghz or other frequencies in the narrowband Personal Communications Spectrum (PCS) spectrum.

A microprocessor 116 controls the operations of each fixed mount marine radio 18, 38. Loud speakers 20, 40 are electrically coupled to the microprocessors 116 and positioned outside fixed mount marine radios 18, 38 as depicted by the placement outside the dashed lines. When a fixed mount marine radio 18, 38 is in the sending mode and the hailer function is activated, microprocessor 116 routes the marine communication through the respective loud speaker 20, 40 for local auditory marine communications. Microphones 72 and speakers 80 are electrically coupled to microprocessors 116. A microphone 72 receives sound for marine communication when the fixed mount marine radio 18, 38 is in the sending mode. A speaker 80 generates sound associated with received marine communications when the fixed mount marine radio 18, 38 is in the receiving mode.

Displays 84 are electrically coupled to microprocessors 116 to provide visual output for data such as the status of the hailer function and the current channel, for example. Inputs 126 are coupled to microprocessors 116. Inputs 126 represents functions such as volume control and 16/9 key, as examples. Transceivers 128 are electrically coupled to microprocessors 116 to convert received radio frequency signals into electrical signals for processing by microprocessors 116 and to convert electrical signals into radio frequency signals for transmission. Transceivers 128 send and receive radio frequency signals via antenna 130. Transceivers 128 and antennas 130 communicate with marine radio remote wireless handsets 26, 46, 50, 52 via wireless links 56, 58, 60, 62.

Similarly, transceivers 132 are electrically coupled to microprocessors 116 to convert received marine radio frequency signals into electrical signals for processing by microprocessor 116 and to convert electrical signals into radio frequency signals for transmission. Push to talk actuators 76 operate transceivers 132 and fixed mount marine radios 18, 38 between sending and receiving modes. Antennas 22, 42 radiate radio frequency signals toward remote stations, such as remote ship stations or coast stations, and receive radio frequency waves from remote stations. Memory modules 138 store the data necessary for the operation of fixed mount marine radios 18, 38. Although fixed mount marine radios 18, 38 are illustrated with a particular configuration, fixed mount marine radios 18, 38 may have a different configuration. For example, the transceivers 128 and antennas 130 may be separate units connected to the fixed mount marine radios 18, 38 via an input port (not shown). Moreover, antennas 22, 42 may represent antenna arrays rather than discrete antennas. Additionally, fixed mount marine radios 18, 38 may employ any power source such as a DC connection to a ship generator or batteries.

Marine radio remote wireless handsets 26, 46, 50, 52 incorporate many components similar to those found in fixed mount marine radios 18, 38. For example, a microprocessor 140 controls the operations of each marine radio remote wireless handset 26, 46, 50, 52. A microphone 102 and speaker 106 within each marine radio remote wireless handset 26, 46, 50, 52 is coupled to the microprocessor 140. As described above, each microphone 102 converts acoustic inputs to electrical signals. Each speaker 106 converts electrical signals to acoustic outputs. Displays 92 and inputs 142 are coupled to microprocessors 140 and operate similar to displays 84 and inputs 126. Transceivers 144 are electrically coupled to microprocessors 140 to convert received radio frequency signals into electrical signals for processing by microprocessor 140 and to convert electrical signals into radio frequency signals for transmission. Push to talk actuators 93 switch transceivers 144 between sending and receiving modes for marine frequency communications via a fixed mount marine radio 18, 38. Antennas 146 radiate radio frequency waves to and receive radio frequency waves from fixed mount marine radios 18, 38, and marine radio remote wireless handsets 26, 46, 50, 52 and more specifically, antennas 130 and 146. Each combination of microprocessor 140, transceiver 144, push to talk actuator 93 and antenna 146 constitutes a complete radio-frequency communication apparatus. It should be understood, however, that a marine radio remote wireless handset may comprise additional or different electronic communication elements, only some of which are depicted in FIG. 3. As seen in FIG. 3, a memory module 148 may be included to store the data necessary for the operation of each marine radio remote wireless handset 26, 46, 50, 52. Preferably, marine radio remote wireless handset 26, 46, 50, 52 is powered by a battery (not shown).

Figure 4:
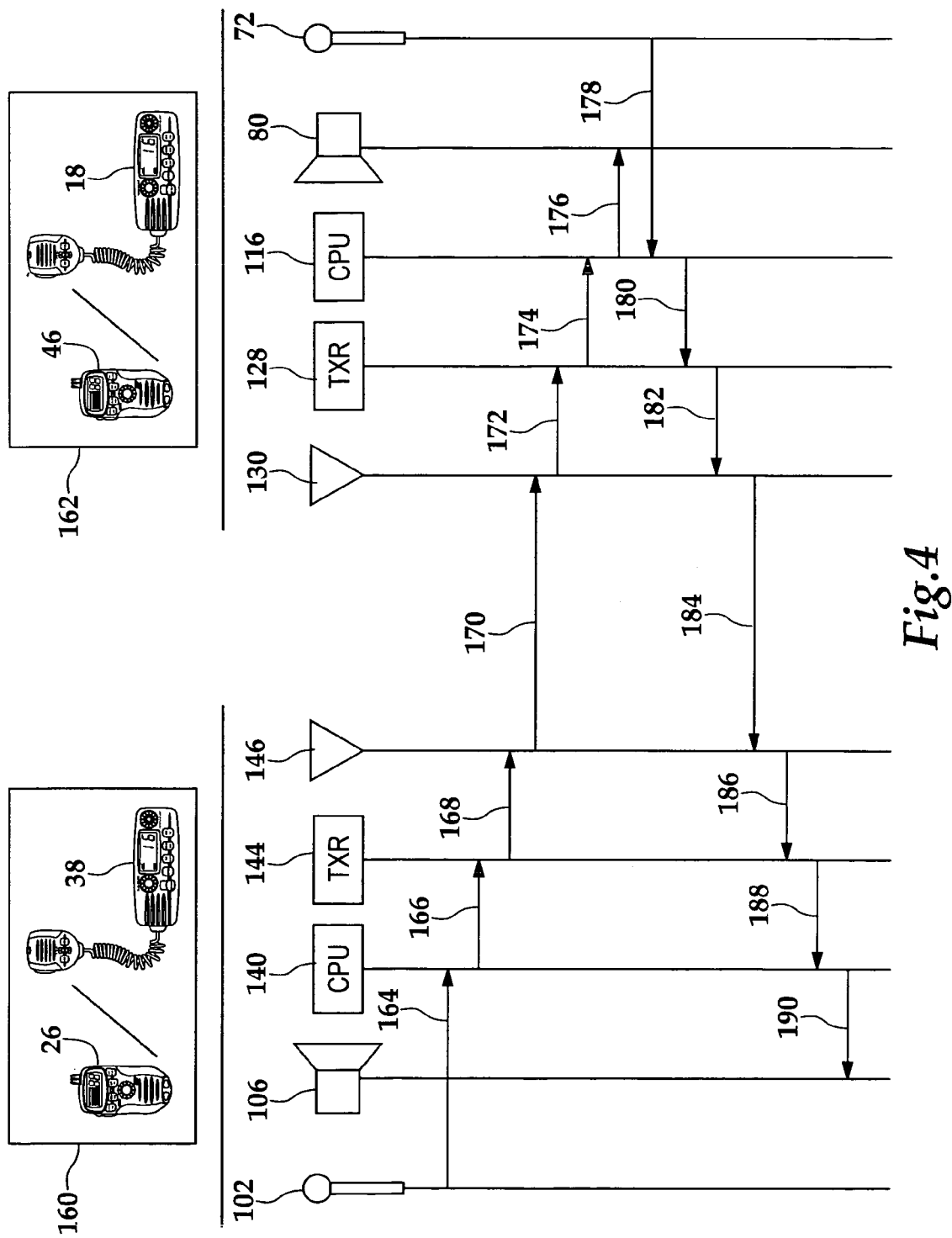
FIG. 4 is a message flow diagram depicting a message flow within the wireless marine communications system of the present invention.

FIG. 4 depicts a message flow diagram depicting the flow of a wireless communication through marine wireless communication system 10. As seen in FIG. 4, the flow of a marine radio wireless communication proceeds in much the same manner without respect to whether the communication originates at marine radio remote wireless handset 26 or fixed mount marine radio frequency transceiver 38. Similarly, the flow of the communication will proceed in generally the same manner without respect to whether the communication is directed to marine radio remote wireless handset 46 or fixed mount marine radio frequency transceiver 18. Accordingly, the following written description of FIG. 4 relates to any such communications between wireless marine radio components and will be described with reference to marine radio remote wireless handset 26 and fixed mount marine radio frequency transceiver 18 for purposes of illustration.

A wireless communication originating at marine radio remote wireless handset 26 could begin as an acoustic input (not shown) received at microphone 102, which converts the acoustic input to an electrical signal 164. Electrical signal 164 is communicated to the microprocessor 140, which sends a repeated electrical signal 166 to the transceiver 144. The repeated electrical signal 166 is converted in the transceiver 144 to a radio frequency signal 168, which is transmitted from antenna 146 across wireless link 56 (see FIG. 2) in the form of wireless signal 170.

Wireless signal 170 is received by fixed mount marine radio 18 via antenna 130, which communicates radio frequency signal 172 to transceiver 128. Radio frequency signal 172 is converted by transceiver 128 to electrical signal 174, which is communicated to microprocessor 116 and repeated to speaker 80 in the form of electrical signal 176. Speaker 80 then converts electrical signal 176 to an acoustic output (not shown).

A response to the original wireless message may originate in the form of an acoustic input signal (not shown) to microphone 72 of fixed mount marine radio 18. Microphone 72 converts the acoustic input signal to an electrical signal 178, which is communicated to microprocessor 116 and repeated to transceiver 128 in the form of electrical signal 180. Transceiver 128 converts electrical signal 180 to radio frequency signal 182, which is communicated to antenna 130 and then across wireless link 56 in the form of wireless signal 184.

Wireless signal 184 is received by antenna 146 of marine radio remote wireless handset 26, at which point it is communicated to transceiver 144 in the form of radio frequency signal 186. Transceiver 144 converts radio frequency signal 186 to an electrical signal 188, which is communicated to microprocessor 140, repeated to speaker 106 in the form of electrical signal 190, and converted to an acoustic output (not shown) by speaker 106.

Figure 5:
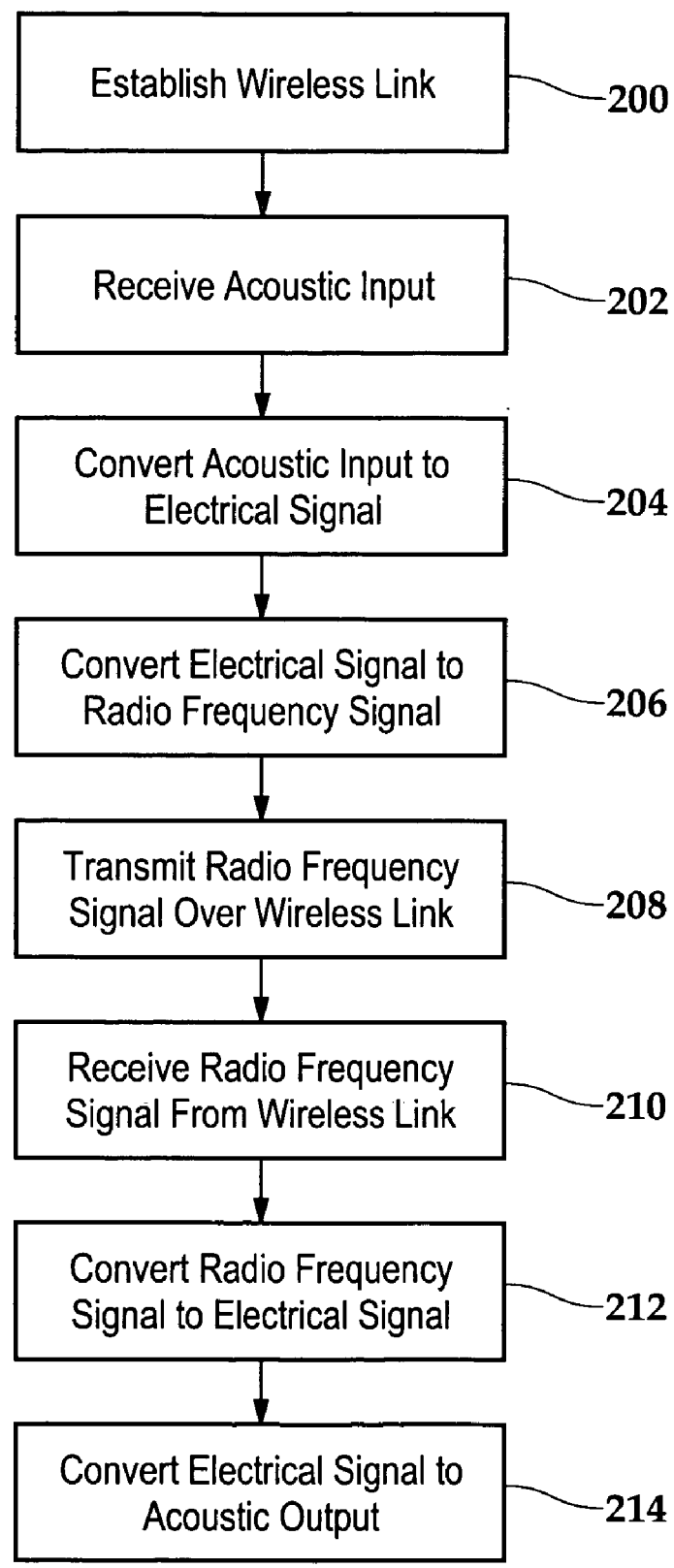
FIG. 5 is a flow chart depicting a method of communication according to certain embodiments of the present invention.

The above-described process of wireless communication is depicted in flowchart form in FIG. 5. Process flow begins in block 200, where a wireless link is established between two wireless components of system 10. In block 202, an acoustic input is received at one of the wireless components. This acoustic input is converted to an electrical signal in block 204. The electrical signal is converted to a radio frequency signal in block 206, which is transmitted over the wireless link in block 208. The radio frequency signal is received by the other wireless component in block 210 and converted to an electrical signal in block 212. Finally, the electrical signal is converted to an acoustic output in block 214.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of communicating between first and second wireless marine radio components of a marine radio frequency communication system disposed on-board a waterborne vessel, the method comprising the steps of:
   establishing a first wireless communication link between the first and second wireless marine radio components;
   receiving an acoustic input signal at the first wireless marine radio component;
   processing the acoustic input signal within the first wireless marine radio component to generate an electrical signal representing the acoustic input signal;
   transmitting a wireless signal incorporating the acoustic input signal over the first wireless communication link;
   receiving the wireless signal at the second wireless marine radio component;
   processing the wireless signal within the second wireless marine radio component to generate an electrical signal representing the acoustic input signal; and
   generating an acoustic output signal at the second wireless marine radio component representing the acoustic input signal received at the first wireless marine radio component.

2. The method as recited in claim 1 wherein the first wireless marine radio component is a marine radio remote wireless handset and the second wireless marine radio component is a marine radio remote wireless handset.

3. The method as recited in claim 1 wherein one of the first and second wireless marine radio components is a marine radio remote wireless handset and the other wireless marine radio component is a marine radio frequency transceiver.

4. The method as recited in claim 1 wherein the first wireless marine radio component is a marine radio frequency transceiver and the second wireless marine radio component is a marine radio frequency transceiver.

5. The method as recited in claim 1 further comprising the steps of:
   establishing a second wireless communication link between the first wireless marine radio component and a third wireless marine radio component;
   transmitting a wireless signal incorporating the first electrical signal from the first wireless marine radio component to the third wireless marine radio component across the second wireless communication link;
   receiving the wireless signal at the third wireless marine radio component;
   processing the wireless signal within the third wireless marine radio component to generate a third electrical signal representing the acoustic input signal; and
   generating an acoustic output signal at the third wireless marine radio component representing the acoustic input signal.

6. The method as recited in claim 1 wherein at least one of the first and second wireless marine radio components is operable to send a communication to a remote station selected from the group comprising remote ship stations and remote coast stations.

7. The method as recited in claim 6 further comprising the step of transmitting a signal from at least one of the first and second wireless marine radio components across a marine radio frequency.

8. An apparatus for communicating within a marine radio frequency communication system disposed on-board a waterborne vessel comprising:
   first and second wireless marine radio components;
   a means for establishing a wireless communication link between the first and second wireless marine radio components;
   a means for receiving an acoustic input signal at the first wireless marine radio component;
   a means for processing the acoustic input signal within the first wireless marine radio component to generate a first electrical signal representing the acoustic input signal;
   a means for transmitting a wireless signal representing the acoustic input signal from the first wireless marine radio component to the second wireless marine radio component across the wireless communication link;
   a means for receiving the wireless signal at the second wireless marine radio component;

a means for processing the wireless signal within the second wireless marine radio component to generate a second electrical signal representing the acoustic input signal; and a means for generating an acoustic output signal at the second wireless marine radio component representing the acoustic input signal received at the first wireless marine radio component.

9. The apparatus as recited in claim 8 wherein the first wireless marine radio component is a marine radio remote wireless handset and the second wireless marine radio component is a marine radio remote wireless handset.

10. The apparatus as recited in claim 8 wherein one of the first and second wireless marine radio components is a marine radio remote wireless handset and the other wireless marine radio component is a marine radio frequency transceiver.

11. The apparatus as recited in claim 8 wherein the first wireless marine radio component is a marine radio frequency transceiver and the second wireless marine radio component is a marine radio frequency transceiver.

12. The apparatus as recited in claim 8 further comprising:

a third wireless marine radio component;

a means for establishing a second wireless communication link between the first wireless marine radio component and the third wireless marine radio component;

a means for transmitting a wireless signal incorporating the first electrical signal from the first wireless marine radio component to the third wireless marine radio component across the second wireless communication link;

a means for receiving the wireless signal at the third wireless marine radio component;

a means for processing the wireless signal within the third wireless marine radio component to generate a third electrical signal representing the acoustic input signal; and a means for generating an acoustic output signal at the third wireless marine radio component representing the acoustic input signal.

13. The apparatus as recited in claim 8 wherein at least one of the first and second wireless marine radio components is operable to selectively operate a hailer function that diverts an output signal from a fixed mount marine radio to a loud speaker.

14. The apparatus as recited in claim 8 wherein at least one of the first and second wireless marine radio components is operable to send a communication to a remote station selected from the group comprising remote ship stations and remote coast stations.

15. A wireless marine radio system comprising:

a first wireless marine radio component having a first microphone, a first speaker, a first local wireless transceiver operably connected to a first local wireless antenna and a first processor operable to coordinate communication between the first microphone, the first speaker and the first local wireless transceiver; and a second wireless marine radio component having a second microphone, a second speaker, a second local wireless transceiver operably connected to a second local wireless antenna and a second processor operable to coordinate communication between the second microphone, the second speaker and the second local wireless transceiver;

wherein the first local wireless transceiver and second local wireless transceiver are operable to establish a local wireless link through the first and second local wireless antennas; and wherein each of the first and second processors communicate signals from the respective first and second microphones across the wireless link and communicate signals received across the wireless link to the respective first and second speakers.

16. The system as recited in claim 15 wherein the first wireless marine radio component is a marine radio remote wireless handset and the second wireless marine radio component is a marine radio remote wireless handset.

17. The system as recited in claim 15 wherein one of the first and second wireless marine radio components is a marine radio remote wireless handset and the other wireless marine radio component is a fixed mount marine radio frequency transceiver.

18. The system as recited in claim 15 wherein the first wireless marine radio component is a fixed mount marine radio frequency transceiver and the second wireless marine radio component is a fixed mount marine radio frequency transceiver.

19. The system as recited in claim 15 further comprising a third wireless marine radio component having a third microphone, a third speaker, a third local wireless transceiver operably connected to a third local wireless antenna and a second processor operable to coordinate communication between the third microphone, the third speaker and the third local wireless transceiver.

20. The system as recited in claim 19 wherein at least one of the first and second wireless marine radio components is operable to send a communication to a remote station selected from the group comprising remote ship stations and remote coast stations.

* * * * *